United States Patent [19]

May et al.

[11] Patent Number: 4,685,074

[45] Date of Patent: Aug. 4, 1987

[54] FILM AREA COMPUTER

[75] Inventors: Joe T. May, Leesburg; Steven D. Hale, Lovettsville, both of Va.

[73] Assignee: Electronic Instrumentation and Technology, Sterling, Va.

[21] Appl. No.: 670,647

[22] Filed: Nov. 13, 1984

[51] Int. Cl.$^4$ .................... G01B 11/28; G06G 15/46
[52] U.S. Cl. .................................. 364/564; 356/380; 364/550; 382/28
[58] Field of Search ............... 364/550, 555, 560, 564, 364/571; 356/239, 379, 380, 435; 382/8, 23, 28, 62, 65, 66, 67

[56] References Cited

U.S. PATENT DOCUMENTS

| | | | |
|---|---|---|---|
| 3,515,487 | 6/1970 | Hatcher, Jr. et al. | 356/379 |
| 3,738,752 | 6/1973 | Heinz et al. | 356/239 |
| 4,008,967 | 2/1977 | Kiemle | 356/239 |
| 4,156,231 | 5/1979 | Edamatsu et al. | 382/28 |
| 4,218,142 | 8/1980 | Kryger et al. | 356/239 |
| 4,255,057 | 3/1981 | Williams | 356/435 |
| 4,388,610 | 6/1983 | Tsunekawa | 382/23 |
| 4,473,797 | 9/1984 | Shiota | 364/571 |
| 4,546,444 | 10/1985 | Bullis | 364/550 |
| 4,564,290 | 1/1986 | Bell et al. | 356/380 |
| 4,573,798 | 3/1986 | Fujie et al. | 356/380 |

OTHER PUBLICATIONS

Kahn Instruments Brochure, "Don't Estimate . . . Calculate!".

Primary Examiner—Felix D. Gruber
Assistant Examiner—Kevin J. Teska
Attorney, Agent, or Firm—Faegre & Benson

[57] ABSTRACT

An instrument for use with a film containing a printed circuit layout. The instrument measures the area which is transparent to electromagnetic radiation of a characteristic wavelength so that the open area of the film and the average open area can be calculated and displayed. A source oriented in a direction perpendicular to the transport path emits radiation of the characteristic wavelength across a width of the film. A plurality of detecting devices responsive to the characteristic wavelength are arranged in a linear array in optical coordination with the source. Each detecting device detects radiation transmitted through an incremental area of the film and produces an output signal representative thereof. A detector circuit connected to receive the output signals repeatedly and sequentially provides digital area signals proportional to the amount of clear area within a respective incremental area of film. A microcomputer receives the area signals and computes the total clear area. A digital display provides a visual indication of the total clear area.

33 Claims, 7 Drawing Figures

FILM AREA COMPUTER

BACKGROUND OF THE INVENTION

1. Field of the Invention.

The present invention relates to the manufacture of printed circuits from photographic films carrying an image of the conductive circuit instrument for measuring the clear area on a film containing a printed circuit layout.

2. Description of the Prior Art.

Printed circuit fabrication requires the plating of a thin layer of metal on various portions of the circuit. To insure product quality and save precious metals, it is desirable to accurately control thickness of the plating applied to the printed circuit.

A layout containing the conductor pattern which is to be plated is usually imprinted upon a photographic film media. Different types of film media are used depending upon the particular plating process. Common film media include silver halide and diazo films. By measuring from the layout design the area to be plated, it is possible to determine how much metal will be required for each printed circuit. The plating process can then be controlled with greater accuracy using this information.

Instruments which measure the total amount of clear area within a film pattern are commercially available. Such instruments typically utilize a light source and a detector positioned within an enclosed area. After calibration a film is positioned between the light source and the detector. The ratio of the light received by the detector through the film to that received through a totally open film of the same type if roughly proportional to the amount of clear area within the film.

The prior measuring instruments are relatively large in size since they must accommodate and simultaneously illuminate the entire film area. In addition, the manual calibration procedures which must be performed on these instruments in order to obtain a reading are difficult and time-consuming. Variations of the intensity of the illumination at varying points across the surface of the film results in inaccuracies in measurement which can not be eliminated by the initial calibration steps.

A simple film area computer which can be conveniently positioned within a laboratory or manufacturing plant is desired. This instrument should be easy to use, requiring a minimum of effort on the part of the operator. A self-calibrating film area computer is very desirable. In addition, the instrument should be capable of accurately measuring and displaying both the total amount of clear area and the total area within the film. The instrument should also be compatible with all types of films, including silver halides and diazos.

SUMMARY OF THE INVENTION

The present invention is an improved instrument for measuring an area within a film which is clear or transparent to electromagnetic radiation having a characteristic wavelength. The film will have areas which are transparent and areas which are closed or opaque to the radiation.

The instrument includes a source of electromagnetic radiation for emitting radiation having the characteristic wavelength across a width of the film. A plurality of detecting devices are responsive to the characteristic wavelength and are arranged in a linear array in optical coordination with the source. Each detecting device detects an amount of radiation transmitted through an incremental area of the film and produces an output signal representative thereof. A transport means introduces relative motion of a constant velocity between the film and the source means and the detecting devices. Detector circuit means are connected to receive the output signals from the detecting devices. The detector circuit is constructed and arranged to repeatedly and sequentially provide area signals proportional to the amount of clear area within respective incremental areas of film. A microcomputer is connected to receive the area signals and is constructed and arranged for computing the total clear area within the film. A signal representative thereof is provided.

Preferred embodiments of the present invention include a display which is connected to the microcomputer to provide a digital display of the total clear area within the film. This measurement is provided in units of either square inches or square centimeters.

A film edge sensor senses leading and trailing edges of the film and provides signals represenative thereof. The microcomputer is connected to receive these signals and starts the transport when the leading edge signal is sensed and stops the transport when the trailing edge signal is sensed.

The film area computer also computes the total area of the film and provides a visual display thereof.

DETAILED DESCRIPTION OF THE PREFERRED EMBODIMENTS

A. Sequential Emitting Film Area Computer

Figure 1:
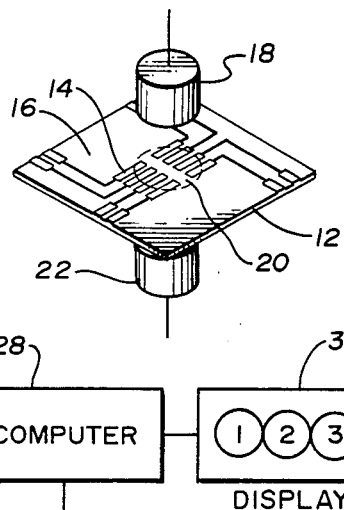
FIG. 1 illustrates a single emitter/detector pair and is used to describe the concept embodied by the invention.

Film area computer 10 of the present invention is an electro-optical instrument which measures the effective open or clear area of a film containing a layout design for a printed circuit. The concept underlying the operation of film area computer 10 is illustratd by FIG. 1. Film 12 contains a layout design for a printed circuit. The layout design will include opaque areas illustrated generally as closed areas 14 and open areas illustrated generally as clear areas 16.

An emitting device 18 is oriented to emit electromagnetic radiation of a chracteristic wavelength upon a first side of film 12. The radiation emitted by emitting device 18 impinges upon an incremental area 20 of film 12. Emitting device 18 is driven by a current signal. An amount of electromagnetic radiation emitted is proportional to a magnitude of the current signal supplied.

A detecting device 22 is positioned on a second side of film 12 and is oriented to receive radiation passing through incremental area 20 of film 12. Detecting device 22 produces an output current signal having a magnitude proportional to an amount of radiation detected.

The amount of radiation detected by detecting device 22 will depend upon the amount of radiation emitted by emitting device 18 and an amount of this radiation which is transmitted by incremental area 20 of film 12. If incremental area 20 is comprised completely of open area 16, almost all radiation emitted will be transmitted through film 12 and detected by detecting device 22. On the other hand, incremental area 20 may be comprised completely of closed area 14 in which case detecting device 22 will detect none of the radiation emitted by emitting device 18.

In many instances, incremental area 20 will include both open areas 16 and closed areas 14. Incremental area 20 of film 12 will then transmit an amount of radiation proportional to the amount of open area 16. The magnitude of the output current signal produced by detecting device 22 will therefore be proportional to the amount of open area 16 present within incremental area 20 of film 12.

Prior art area computers have used this technique to measure the area of the entire film using a single source and detector. Such arrangements do not compensate for variations in the illumination level across the film and require a large machine capable of illuminating the entire film.

Figure 2:
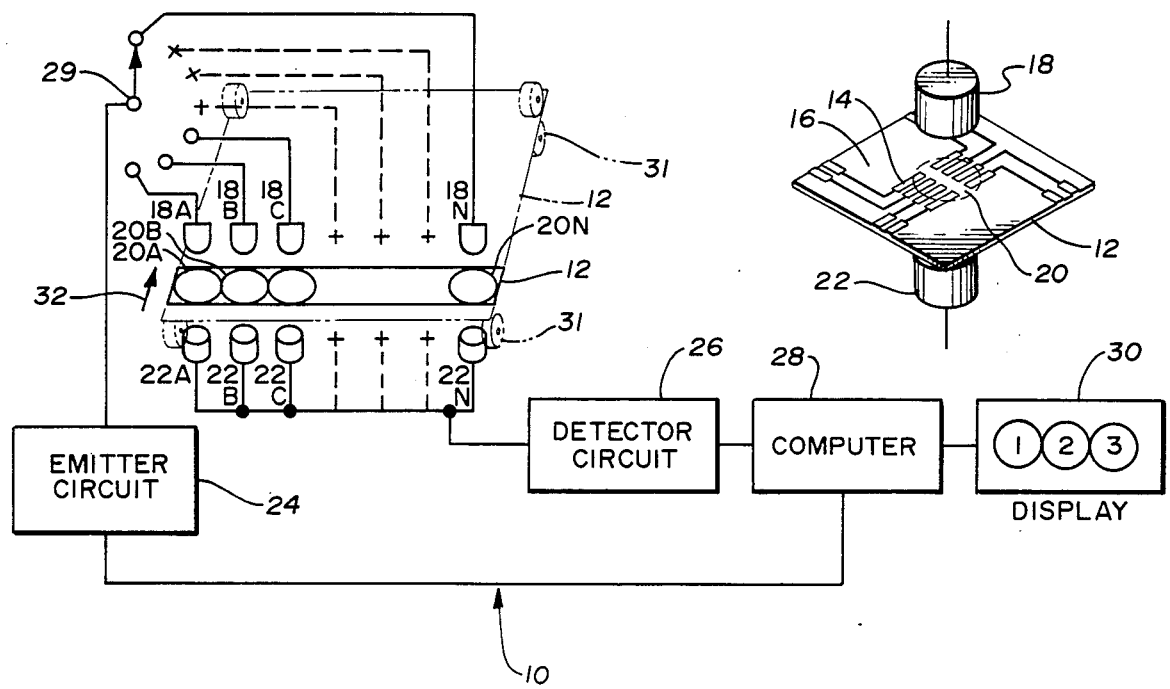
FIG. 2 is a schematic representation of the present invention.

Film area computer 10 utilizes a plurality of measurements of the type described above to measure the total amount of open area within film 12 by combining a series of incremental measurements. FIG. 2 illustrates schematically the operation of film area computer 10. As shown in FIG. 2, film area computer 10 includes emitting devices 18A-18N, detecting devices 22A-22N, emitter circuit means 24, detector circuit means 26, microcomputer 28, display means 30, and a transport mechanism 31 for providing relative movement between the film and the emitting and detecting elements. Transport mechanism 31 is used to transport film 12 along transport path 32. The transport mechanism may be comprised of any apparatus capable of transporting film 12 at a constant velocity. A transport mechanism which includes rollers to transport film 12 has been successfully used.

As shown in FIG. 2, emitting devices 18A-18N are arranged in a linear array which, in a preferred embodiment, is oriented perpendicular to transport path 32. As long as the array of emitting devices 18A-18N extends across a width of film 12 to be measured, the orientation relative to the transport path is not critical as long as it remains fixed. Each emitting device 18A-18N is positioned in close proximity to film 12 and is oriented to deliver radiation to an incremental area 20A-20N, respectively.

Emitter circuit means 24 is connected to receive a series of emitter control signals from a control device, such as microcomputer 28. An individual emitter control signal is received for each emitting device 18A-18N. As illustrated diagramatically by switch 29, emitter circuit 24 sequentially directs a current signal to each emitting device 18A-18N in response to a corresponding emitter control signal.

Upon receiving a first emitter control signal, emitter circuit 24 supplies a current signal to emitting device 18A. The current signals are in the form of pulses having a brief duty cycle. The current signal causes emitting device 18A to emit radiation upon incremental area 20A of film 12. After emitting device 18A is turned off, a second emitter control signal will be received and emitter circuit 24 will cause emitting device 18B to emit radiation upon adjoining incremental area 20B of film 12. This sequence continues until the last emitting device 18N of the array emits radiation upon incremental area 20N. This completes a scan of the width of film 12.

A plurality of detecting devices 22A-22N are arranged in a linear array and in optical coordination with emitting devices 18A-18N. Detecting devices 22A-22N are oriented to receive radiation transmitted through incremental areas 20A-20N, respectively. An output signal of each detecting device 22A-22N will be a current signal having a magnitude proportional to the amount of radiation detected.

Detector circuit means 26 is connected to receive the series of individual current signals produced by detecting devices 22A-22N. In response to the output current signals, detector circuit 26 produces a series of individual area signals which are proportional to the amount of clear area 16 within incremental areas 20A-20N, respectively.

Microcomputer 28 controls the operation of film area computer 10. Microcomputer 28 includes associated random access memory (RAM) and read only memory (ROM). Programs and constants are stored in ROM. Other data generated and received by microcomputer 28 are stored temporarily in RAM.

Microcomputer 28 is connected to provide emitter control signals to emitter circuit 24. Microcomputer 28 is also connected to receive the incremental area signals from detector circuit 26. A program stored within ROM causes microcomputer 28 to provide a sequence of emitter control signals to emitter circuit 24. The program identifies the corresponding area signals produced in response by detector circuit 26 and temporarily stores these signals in RAM. Microcomputer 28 sums the incremental area signals. By summing the area signals produced by a scan of the width of film 12, microcomputer 28 is in effect measuring the amount of clear area 16 across an incremental width of film 12.

Figure 3:
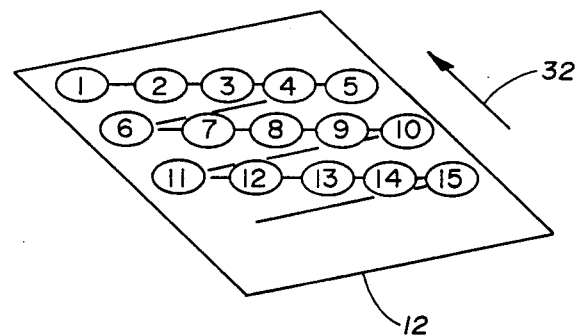
FIG. 3 illustrates the technique whereby individual incremental area of the entire film are measured to computer the total clear area.

FIG. 3 illustrates the method by which film area computer 10 measures the total clear area 16 on film 12. Transport mechanism 31 is under control of microcomputer 28 and moves film 12 at a constant velocity as the scanning sequence is performed. After completion of a scan, film 12 will have moved a predetermined distance along transport path 32. Successive scans will therefore occur over adjacent incremental widths of film 12. The scanning procedure will continue until adjacent widths along a lengths of film 12 have been scanned.

Microcomputer 28 computes the total amount of clear area within film 12 by summing the area signals from incremental areas on successive widths of film. When the whole film has been scanned, the sum of the area signals will represent the total clear area 16 within film 12. Display means 30 is connected to microcomputer 28 and receives a signal representative of the total clear area 16. Display 30 produces a visual display of the total clear area 16 within film 12. Microcomputer 28 will provide the measurement in the units of square centimeters and square inches.

Figure 4:
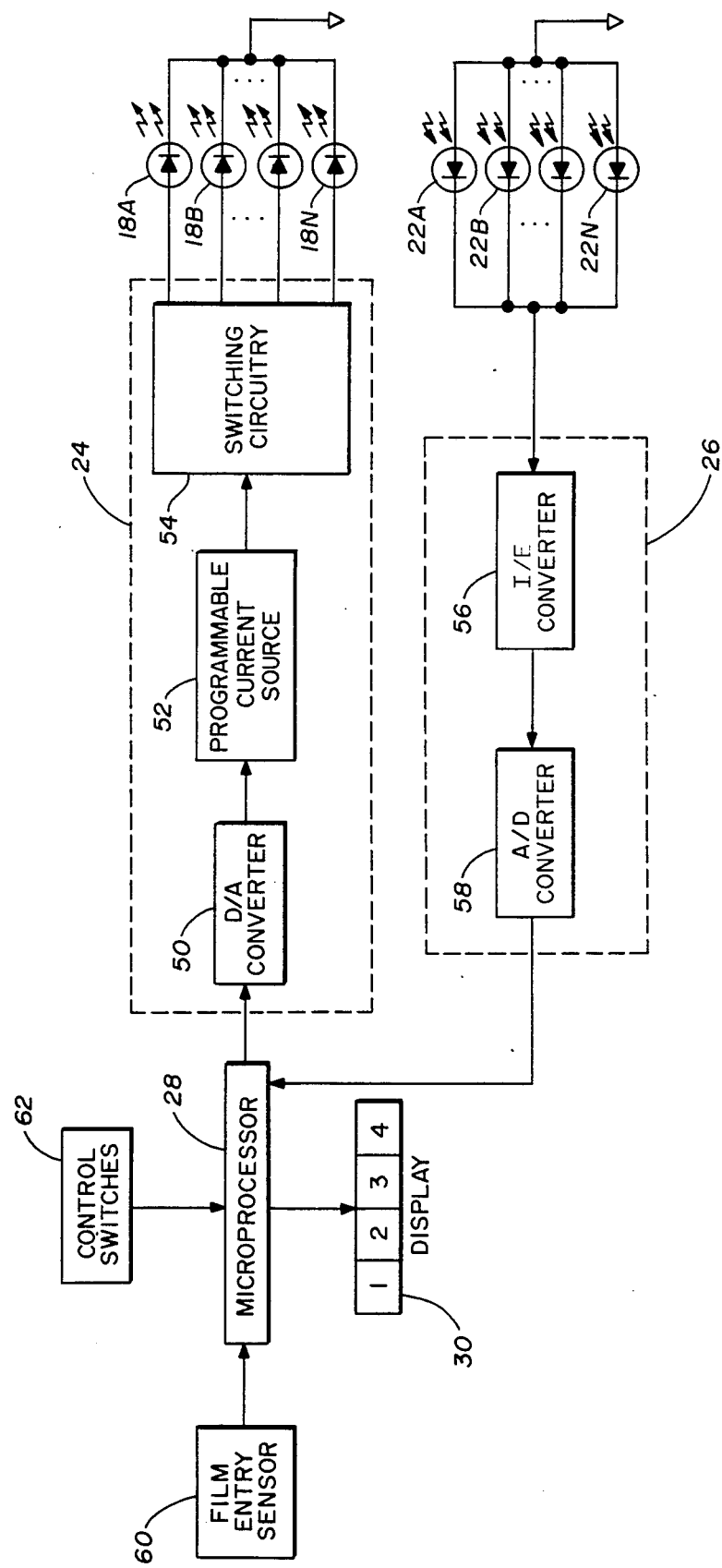
FIG. 4 is a block diagram representation of the sequential emitting version of the film area computer.

A preferred embodiment of film area computer 10 is illustrated in block diagram form by FIG. 4. Emitting devices 18A-18N are comprised of light emitting diodes (LEDs). The LEDs emit electromagnetic radiation having a characteristic wavelength. Commercially-available prepackaged LEDs have been successfully used. One common array includes a series of 130 LEDs separated by 0.22 inch centers.

Detecting devices 22A–22N are comprised of photodiodes. The photodiodes are receptive to the characteristic wavelength emitted by the LEDs. Commercially-available prepacked photodiodes have been used.

As illustrated in FIG. 4, emitter circuit 24 includes digital-to-analog converter 50, programmable current source 52, and switching circuitry 54. Digital-to-analog (D/A) converter 50 receives digitally coded emitter control signals from microprocessor 28. Each emitter control signal represents a magnitude of the current signal which is to be supplied to an individual emitting device 18A–18N. D/A converter 50 converts the digital emitter control signals to analog signals having proportional magnitudes. D/A converter 50 produces voltage signals which are proportional to an amount of current to be supplied to an emitting device 18A–18N, respectively.

Programmable current source 52 is connected to receive analog emitter control signals from D/A converter 50. Programmable current source 52 produces emitter current signals having magnitudes proportional to the analog emitter signals received.

Switching circuitry 54 is connected to receive the emitter current signals from programmable current source 52. Switching circuitry 54 directs each emitter current to its respective emitting device 18A–18N. Although illustrated as a mechanical device in FIG. 2 for ease of understanding, switching circuitry 54 will preferably be an electronic device under control of microcomputer 28.

As shown in FIG. 4, detector circuit 26 includes current-to-voltage (I/E) converter 56 and analog-to-digital (A/D) converter 58. Detector circuit 26 provides digitally coded signals representative of the total clear area 16 within incremental areas 20A–20N in response to current signals from detecting devices 22A–22N, respectively. I/E converter 56 is connected to receive the current signals produced by detecting devices 22A–22N. I/E converter 56 converts each current to a voltage signal having a proportional magnitude. A/D converter 58 is connected to receive the voltage signals. A/D converter 58 converts each voltage signal to a digitally coded area signal.

Film area computer 10 preferably includes film sensor 60. Although film sensor 60 may be comprised of any common sensing apparatus, reflective photo-emitter/detector devices have been successfully used. Film sensor 60 is connected to microcomputer 28 and supplies signals indicative of the presence of both a leading and a trailing edge of film 12. When film 12 is placed within film area computer 10, film sensor 60 will detect the leading edge. Microcomputer 28 will respond by activating the transport mechanism and initiating the scanning sequence. Similarly, when the entire film has been scanned and the trailing edge is detected, microcomputer 28 will stop the transport mechanism after a period of time sufficient for the film to exit the transport mechanism.

The area of interest on a film will typically be less than the total film area. To delineate the area of interest within film 12, a black border, opaque to radiation of the characteristic wavelength, having a width of at least one-half (½) inches will surround the area to be measured. As the scanning procedure outlined above continues, a program stored within ROM of microcomputer 28 will recognize the presence of the border. The program causes only those incremental area signals produced from within the border to be summed. Signals received from areas outside the border are not used.

Stored within ROM of microcomputer 28 is information representing the distance between individual LEDs of the array. Information representing the velocity at which film 12 is transported is also stored within ROM. Microcomputer 28 uses this information, as well as the detected position of the black border, to computer the total area of film within the border.

An operator interfaces with film area computer 10 through control switches 62 illustrated generally in FIG. 4. Included is a POWER-UP switch which causes electric power from a source to be applied to electric elements within film area computer 10. An ENTER switch initiates entry of measured data into computer memory for averaging with previous readings. A REVERSE switch causes the transport mechanism to back film 12 out of film area computer 10.

Each incremental area measurement made by an emitter/detector pair is precise but relatively inaccurate. However, because the inaccuracies are normally distributed, the average of a large number of measurements will approach the true mean. The average of the measurements of clear film area and total film area within the border are therefore very accurate. Higher accuracy is achieved by making several measurements of the same film. Microcomputer 28 stores in RAM the individual measurements and computes the average of the individual measurements. By operating a DISPLAY switch, an operator is able to have the display provide a digital indication of total film area or clear area from the last measurement, or an average film area or average clear area of all measurements taken. A RESET switch is actuated to erase all previous measurements from RAM.

An average of film area computer 10 is that it is self-calibrating, requiring no adjustments by the operator before use. Calibration is required because the electrical characteristics of individual emitting and detecting devices vary with manufacture, time, temperature, etc. To illustrate the problem, consider that a constant amount of current supplied to each emitting device will produce a different amount of radiation from each of the devices. In addition, if a constant amount of illumination is impinged upon each detecting device, the magnitude of output current produced by each will differ slightly.

To compensate for these variations, film area computer 10 includes a calibration program stored within ROM. The calibration procedure is performed continuously from the moment the POWER-UP switch is actuated until a film is detected by sensor 60. Calibration is achieved by normalizing each emitter/detector pair such that the output of each detecting device 22A–22N is a constant value, equal to each other emitter detector pair, before a film is scanned. The calibration program includes a digital code constant representing the desired output from each of detecting devices 22A–22N when film is not present between the respective emitting and detecting devices.. The calibration program then varies each digital emitter control signal until its corresponding detector produces a current having a magnitude corresponding to the digital code constant.

The calibration procedure is performed as follows. Each emitter control signal is sequentially applied to emitter circuit 24. An emitter current of proportional magnitude is sequentially applied to emitting devices 18A–18N, respectively. A specific amount of radiation is produced by each emitting device 18A–18N, respectively. Each detecting device 22A–22N sequentially produces a specific output current in response to the amount of radiation received. Detector circuit 26 converts the sequence of currents into a series of digital codes.

As these digital codes are received by microcomputer 28, they are compared to the digital code constant. If the received digital code is equal to the constant, the respective digital emitter control signal will remain unchanged as that emitter/detector pair is normalized. If the received code is less than the constant, indicating that the current produced by the respective detecting device is less than the normalized amount, the calibration program increases the digital emitter control signal. In this way the current produced by the detecting device will more nearly correspond to the normalized amount. Similarly, if the received code is greater than the constant, the calibration program decreases the digital emitter control signal for that particular emitter.

The calibration procedure outlined above is performed continuously by film area computer 10 upon activation of the POWER-UP switch. When film sensor 60 detects the presence of a film about to be scanned the calibration procedure is stopped and the digital emitter codes present at that time are retained.

Figure 5:
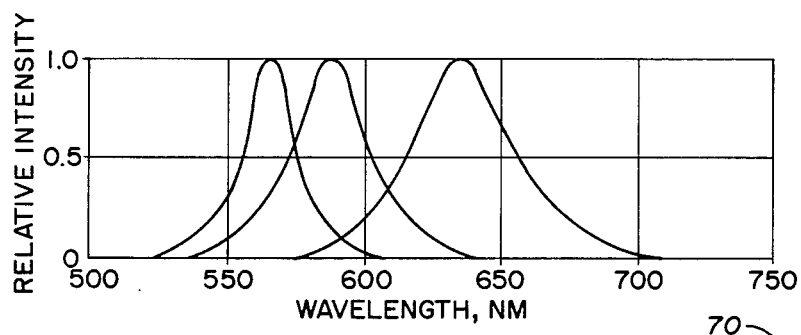
FIG. 5 illustrates the spectral characteristics of various light emitting diodes.

The sequential emitting film area computer described above performs well with films which are closed or opaque to wavelengths in the 550–650 nm range. As illustrated in FIG. 5, the spectral output characteristics of commercially-available LEDs are typically within this range. It is, however, often desirable to measure the clear area of a film media which is opaque to wavelengths which cannot be obtained from LEDs. Diazo film is included within this category.

Figure 6:
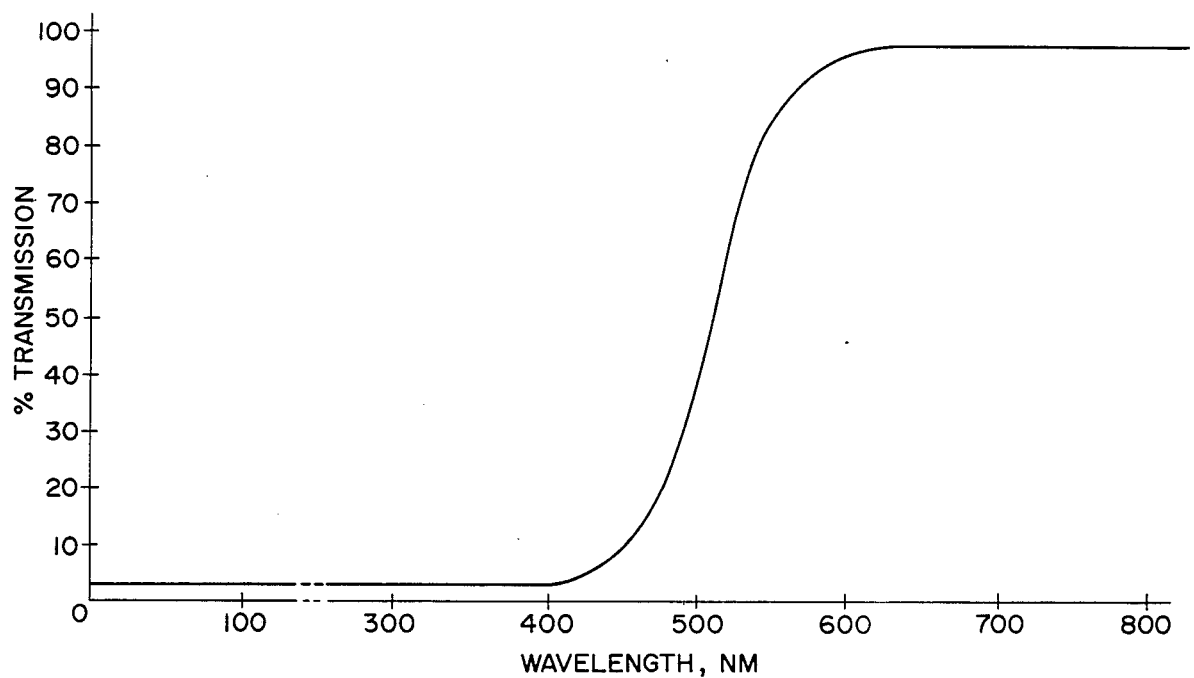
FIG. 6 illustrates the transmission characteristics of diazo film.

FIG. 6 illustrates the transmission characteristics of a typical diazo film. Diazo films are closed to wavelengths in the ultraviolet range of the spectrum (200–400 nm) and translucent or clear to those within the visible range of the spectrum (400–700 nm). Since the characteristic wavelengths generated by LEDs are readily transmitted by the "closed" portions of diazo film, these devices are unusable as emitting devices.

B. Sequential Detecting Film Area Computer.

Figure 7:
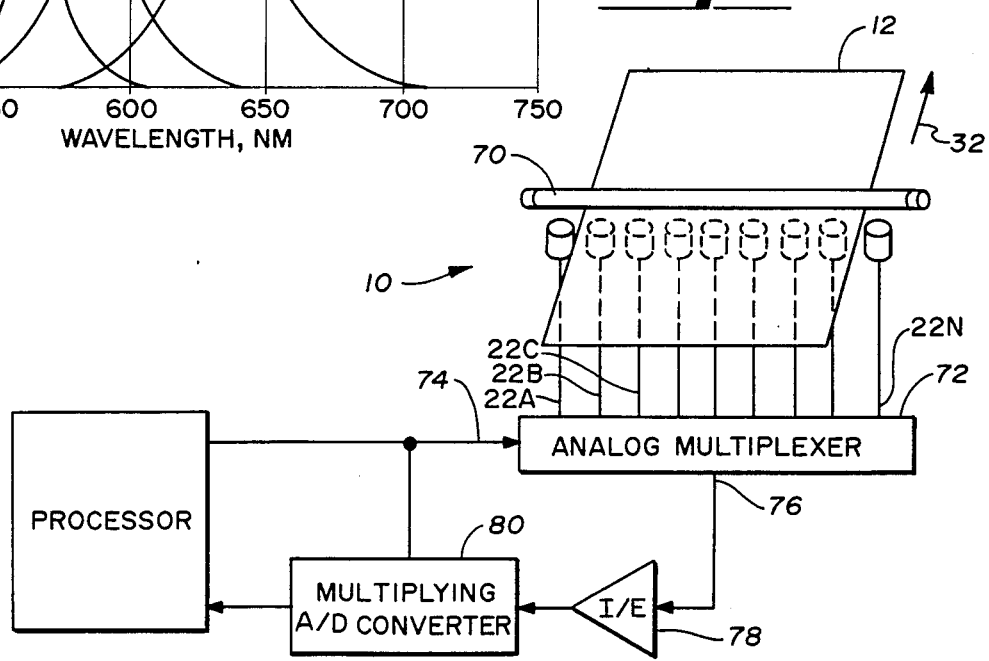
FIG. 7 is a schematic representation of the sequential detecting film area computer.

FIG. 7 illustrates a sequential detecting version of film area computer 10 which is capable of measuring the total area and total clear area of a film, such as diazo, which is closed to ultraviolet wavelengths. Light source 70 is a lamp which is positioned perpendicular to transport path 32 and continuously illuminates a width of film 12. A spectral output of lamp 70 will be tailored to provide radiation having a characteristic wavelength at which the film to be measured is closed. A mercury vapor lamp surrounded by a color filter for filtering virtually all radiation except that having a characteristic wavelength of 365 nm is usuable for diazo film.

Detecting devices 22A–22N are positioned in a linear array in optical coordination with source 70. Detecting devices 22A–22N each receive radiation transmitted through an incremental area of film 12. An output of each detecting device 22A–22N is connected to a separate input of analog multiplexer 72.

Digital control signals from micrcomputer 28 are input to control terminal 74 of multiplexer 72. The control signals are a series of digital codes, each representing one of detecting devices 22A–22N. Analog multiplexer 72 will connect the output of the detecting device represented by the control signal received to output terminal 76. In this way a sequence of detecting device output signals will be present at output terminal 76 in response to a sequence of control signals generated by microcomputer 28.

Each output signal from detecting devices 22A–22N is again a current signal having a magnitude proportional to an amount of radiation detected. Current-to-voltage converter 78 converts these signals into voltage signals of proportional magnitude. Analog-to-digital converter 80 converts each voltage signal to a digital code. Each digital code represents an amount of clear area within the respective incremental area of film. Microcomputer 28 processes these digital signals to compute the total clear area with the film just as it did with the sequential emitting version. All other algorithms and control features of the sequential emitting version are identical and incorporated herein.

A calibration routine of the sequential detecting film area computer utilizes the same concept as that of the sequential emitting version. It is, however, implemented in a different manner. Light source 70 provides a constant amount of radiation to each detecting devices 22A–22N when film 12 is not present. Detecting devices 22A–22N are normalized to produce a constant digital code from analog-to-digital converter 80 under these circumstances.

Analog-to-digital converter 80 is a multiplying analog-to-digital converter. Each analog input received by analog-to-digital converter 80 is multiplied by a gain constant before being converted to digital form. Microcomputer 28 supplies the gain constant which corresponds to the respective detecting device 22A–22N having its output signal processed. Each gain constant is adjusted until the digital code produced by analog-to-digital converter 80 matches the constant which should be produced when the respective detecting device 22A–22N is illuminated directly by light source 70. The calibration procedure is performed continuously until a film 12 is detected, at which time the gain constants are stored and used as clear area on the film is being measured.

To summarize, the film area computer of the present invention is an opto-electronic instrument for measuring the amount of clear area within a film containing a circuit layout or other pattern by summing a large number of incremental film area measurements. An array of individual emitter and detector pairs measure the clear area on incremental areas as the film is transported between the arrays. A microcomputer processes the individual signals to compute the total clear area within the film. The total clear area within the film is displayed digitally in units of square centimeters or square inches. The instrument is also self-calibrating.

Although the present invention has been described with reference to preferred embodiments, workers skilled in the art will recognize that changes may be made in form and detail without departing from the spirit and scope of the invention.

What is claimed is:

1. An instrument for measuring an area on a film which is clear or transparent to electromagnetic radiation which has a characteristic wavelength the film having areas which are either clear or transparent or closed or opaque to the radiation, the instrument comprising:

source means projecting radiation having the characteristic wavelength across a segment of a width of the film;

a plurality of detecting devices responsive to the characteristic wavelength of the radiation and arranged adjacent to each other in a linear array in optical coordination with the source means, each detecting device detecting the amount of radiation transmitted through an incremental area of the film and producing an output signal representative thereof;

transport means for introducing relative movement of a constant velocity to the film relative to both the source means and the detecting devices;

detector circuit means constructed and arranged to repeatedly and sequentially convert the output signal of each detecting device into a digital area signal representative of an amount of clear area within the respective incremental area of film; and control means connected to receive the area signals and constructed and arranged for computing the total clear area on the film and providing a signal representative thereof.

2. The instrument of claim 1 and including display means connected to the control means to receive the signal representative of the total clear area on the film and for providing a visual display thereof.

3. The instrument of claim 2 wherein the control means computes the total area of the film and provides a signal representative thereof.

4. The instrument of claim 3 wherein the display means provides a digital display of the total area of the film.

5. The instrument of claim 4 wherein the control means includes storage means for storing successive measurements of total clear area and total film area and wherein the control means also includes means for computing an average of the total clear area measurements and the total film area measurements and providing signals representative thereof.

6. The instrument of claim 5 wherein the display means is connected to receive the signals representing the average of the total clear area and total film area measurements, and is constructed and arranged for providing a visual display thereof.

7. The instrument of claim 2 wherein the display means is a digital display producing a display in the units of square inches or square centimeters.

8. The instrument of claim 1 and further including film edge sensor means for sensing leading and trailing edges of the film and providing signals representative thereof and wherein the control means is connected to the film edge sensor means for receiving the signals indicative of the leading and trailing edges of the film and is also connected to provide control signals to the transport means for starting the transport means when the leading edge of the film is sensed and for stopping the transport means when the trailing edge is sensed.

9. An instrument for measuring an area of a film which is transparent to electromagnetic radiation which has a characteristic wavelength where the film has areas which are either transparent or opaque to the radiation, the instrument including:

a plurality of emitting devices, each delivering electromagnetic radiation having the characteristic wavelength to an incremental area of the film, the devices arranged in a generally linear array traversing a width of the film;

emitter circuit means connected to receive emitter control signals and constructed and arranged for repeatedly and sequentially directing each of the emitting devices to deliver radiation to the incremental area of film in response to an emitter control signal;

a plurality of detecting devices responsive to electromagnetic radiation having the characteristic wavelength and arranged in a linear array in optical coordination with the plurality of emitting devices, each detecting device positioned for receiving radiation produced by a corresponding emitting device which has been transmitted through the film and for producing an output signal proportional to the amount of radiation detected;

transport means for introducing relative movement of a constant velocity to the film relative to both the emitting means and the detecting devices;

detector circuit means connected to receive the output signal from each detecting device and constructed and arranged for providing area signals proportional to the clear or open areas on each incremental portion of the film; and microcomputer means connected to receive the area signals from the detector circuit means and constructed and arranged for providing emitter control signals to the emitter circuit means and for computing the total clear area on the film and providing a signal representative thereof.

10. The instrument of claim 9 and including display means connected to the microcomputer means to receive the signal representative of the total clear area and for providing a visual display of the total clear area on the film.

11. The instrument of claim 10 wherein:

the emitting devices are light emitting diodes (LEDs) for emitting radiation of the characteristic wavelength; and the detecting devices are photodiodes receptive to the characteristic wavelength of the LEDs.

12. The instrument of claim 11 wherein each of the emitter control signals is a digital signal representing a desired magnitude of current to be applied to an LED, the emitter circuit means further including:

digital-to-analog circuit means connected to receive the digital emitter control signals and constructed and arranged to provide analog emitter signals which are an analog representation of the respective digital emitter control signal;

programmable current source means connected to receive the analog emitter signals and constructed and arranged for providing emitter currents of a magnitude proportional to the respective analog emitter signal; and switching means having an input connected to the programmable current source means to receive the emitter currents therefrom and constructed and arranged for repeatedly and sequentially switching emitter current to each respective LED in the linear array.

13. The instrument of claim 12 wherein the output signal produced by each detecting device is a current signal having a magnitude proportional to the amount of radiation received by the detecting device, the detector circuit means further including:

current-to-voltage converter means connected to receive the current signals and producing output voltage signals of a magnitude proportional to the respective current signal; and analog-to-digital converter means connected to receive the voltage signals and constructed and arranged to provide digital area signals representative of the amount of clear area within the respective incremental area.

14. The instrument of claim 10 wherein the film includes a border on all sides which is opaque to the radiation.

15. The instrument of claim 14 wherein the control means computes a total area of film within the border and provides a signal representative thereof.

16. The instrument of claim 15 and including means for storing successive measurements of total film area, the microcomputer means computing the average of the successive measurements and providing a signal representative thereof.

17. The instrument of claim 16 wherein the display means is connected to the microcomputer means to receive the signal representative of the average of successive total film area measurements and is constructed and arranged for providing a digital display thereof.

18. The instrument of claim 15 wherein the display means is connected to receive the signal representative of the total area on the film and provides a visual display of the total area on the film.

19. The instrument of claim 10 and including means for storing successive measurements of total clear area, the microcomputer means computing the average of the successive measurements and providing a signal representative thereof.

20. The instrument of claim 19 wherein the display means is connected to the microcomputer means to receive the signal representative of the average of successive total clear area measurements and provides a visual display thereof.

21. The instrument of claim 9 further including film edge sensor means for sensing leading and trailing edges of the film and providing a leading edge signal when the leading edge is sensed, and trailing edge signal when the trailing edge is sensed and wherein the control means is connected to receive the leading edge and trailing edge signals from the film edge sensor and is constructed and arranged for providing control signals to the transport means for starting the transport means when the leading edge of the film is sensed and for stopping the transport means when the trailing edge of the film is sensed.

22. The instrument of claim 21 wherein the film edge sensor means includes a reflective light emitting diode and detector pair.

23. An instrument for measuring an area of a film which is clear or transparent to electromagnetic radiation which has a characteristic wavelength and where the film has areas which are both clear or transparent and closed or opaque to the radiation, the instrument including:

source means for emitting the radiation across a width of the film;

a plurality of detecting devices responsive to the characteristic wavelength and arranged adjacent to each other in a linear array in optical coordination with the source means to receive radiation trasmitted through adjacent incremental areas of the film, respectively, each detecting device constructed and arranged for producing an output signal proportional to the amount of radiation detected;

transport means for introducing relative motion at a constant velocity to the film relative to the source means and the detecting devices;

detector circuit means connected to receive detector control signals and the output signals from the detecting devices, and detector circuit means being constructed and arranged for converting the output signals into area signals proportional to the clear area on each incremental area of film, respectively, and for providing the area signals at an output in a sequence determined by the detector control signals; and control means connected to receive the area signals from the detector circuit means and constructed and arranged for providing the detector control signals to the detector circuit means and for computing the total clear area on the film and providing a signal representative thereof.

24. The instrument of claim 23 and including display means connected to the control means for receiving the signal representative of the total clear area and for providing a visual display of the total clear area within the film.

25. The instrument of claim 24 wherein the film includes a border on all sides which is closed or opaque to the radiation.

26. The instrument of claim 25 wherein the microcomputer means computes a total area of film within the border and provides a signal representative thereof.

27. The instrument of claim 26 wherein the display means is connected to receive the signal representative of the total area on the film and provide a visual display thereof.

28. The instrument of claim 27 wherein the display means is a visual display producing a readout either in square inches or square centimeters.

29. The instrument of claim 24 wherein:
the source means is an elongated lamp; and
the detecting devices are photodiodes.

30. The instrument of claim 29 wherein each detector control signal is a digital signal representing an individual detecting device, output signals from the detecting devices are current signals having a magnitude proportional to the amount of radiation detected, and the area signals are digital signals, the detector circuit means further including:

multiplexer means connected to receive the current signals and the detector control signals and constructed and arranged for sequentially switching the current signals to a multiplexer output in response to the detector control signals;

current-to-voltage converter means connected to receive the current signals and producing an output voltage signal having a magnitude proportional to the current signal; and analog-to-digital circuit means connected to receive the voltage signals and providing digital area signals representative of the amount of clear area within the respective incremental area of film.

31. The instrument of claim 29 wherein the lamp is a mercury vapor lamp surrounded by a color filter for filtering most all radiation except that having the characteristic wavelength.

32. The instrument of claim 23 further including film edge sensor means for sensing leading and trailing edges of the film and for providing a leading edge signal when the leading edge is sensed, and trailing edge signal when the trailing edge is sensed and wherein the microcomputer means is connected to receive the leading edge and trailing edge signals from the film edge sensor and is constructed and arranged to provide control signals to the transport means for starting the transport means when the leading edge of the film is sensed and for stopping the transport means when the trailing edge of the film is sensed.

33. The instrument of claim 32 wherein the film edge sensor means includes a reflective light emitting diode and detector pair.

* * * * *